(12) United States Patent
Clarke et al.

(10) Patent No.: US 12,348,850 B2
(45) Date of Patent: Jul. 1, 2025

(54) INTEGRATING ELECTRONIC AND PHYSICAL WORKSPACES

(71) Applicant: Samsung Electronics Company, Ltd., Suwon si (KR)

(72) Inventors: Nigel Clarke, Mountain View, CA (US); Fulya Yilmaz, San Francisco, CA (US); Curtis Aumiller, San Jose, CA (US); Mohammad Abu Saude, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 202 days.

(21) Appl. No.: 17/853,731

(22) Filed: Jun. 29, 2022

(65) Prior Publication Data

US 2024/0007730 A1 Jan. 4, 2024

(51) Int. Cl.
H04N 23/56 (2023.01)
G06V 20/52 (2022.01)
H04N 7/18 (2006.01)
H04N 23/74 (2023.01)

(52) U.S. Cl.
CPC .............. *H04N 23/56* (2023.01); *G06V 20/52* (2022.01); *H04N 7/18* (2013.01); *H04N 23/74* (2023.01)

(58) Field of Classification Search
CPC .......... H04N 23/56; H04N 7/18; H04N 23/74; H04N 23/69; G06V 20/52
See application file for complete search history.

(56) References Cited

U.S. PATENT DOCUMENTS

| | | | |
|---|---|---|---|
| 9,747,499 B2 | 8/2017 | Kim | |
| 10,187,546 B2 | 1/2019 | Liu | |
| 2004/0021834 A1* | 2/2004 | Satomi | G03B 27/542 |
| | | | 353/65 |
| 2005/0265014 A1* | 12/2005 | Matsui | H04N 23/56 |
| | | | 348/E5.029 |
| 2023/0090743 A1* | 3/2023 | Pinto | G06V 10/454 |
| | | | 382/141 |
| 2024/0249490 A1* | 7/2024 | Hashimoto | G07G 1/0036 |

FOREIGN PATENT DOCUMENTS

| | | |
|---|---|---|
| KR | 10-2013-0118704 A | 10/2013 |
| KR | 10-2054552 B1 | 12/2019 |
| KR | 10-2021-0001371 A | 1/2021 |

* cited by examiner

*Primary Examiner* — Lin Ye
*Assistant Examiner* — Tuan H Le

(57) ABSTRACT

In one embodiment, an apparatus includes a head unit that includes one or more image sensors and one or more illumination sources. Both an intensity level of the one or more illumination sources and a position or an orientation of the head unit are adjustable. The apparatus also includes one or more processors and one or more memory elements that can execute instructions to capture, by the one or more image sensors, an image of a user's physical workspace, and provide the captured image for display to one or more users.

20 Claims, 4 Drawing Sheets

INTEGRATING ELECTRONIC AND PHYSICAL WORKSPACES

TECHNICAL FIELD

This disclosure generally relates to electronic and physical workspaces.

BACKGROUND

Both collaborative and individual work can be done on electronic platforms using electronic tools or can be done on physical platforms using physical tools. For example, electronic platforms can include computer-based productivity applications and videoconferencing applications, and electronic tools can include webcams, microphones, and computer-input tools (e.g., keyboard, mouse, etc.). Physical platforms and tools can include physical note-taking on pen and paper or on a whiteboard with, e.g., a marker. Electronic platforms and tools can be used to collaborate when users are not in the same physical space, but such collaboration is constrained by the electronic platforms and tools and therefore does not fully realize the benefits and utility of physical tools and workspaces. This poses many problems for user interactions, including lack of awareness of others' work; difficulty in showing hand-drawn, written, or other physically created content; and difficulty in communicating complex information such as mathematical formula.

DESCRIPTION OF EXAMPLE EMBODIMENTS

Systems and methods of this disclosure allow seamless integration of physical workspaces and tools with electronic content, such as electronic collaborations. A user's electronic workspace often includes electronic content, such as slideshows or videoconferencing content, displayed on, e.g., computer monitors or other electronic displays. A user's physical workspace includes objects in their physical area. For example, a user's physical workspace may include a desk that contains paper and writing instruments, or electronic devices such as a smartphone, tablet, laptop, etc. As another example, a user's physical workspace may include a whiteboard or other drawing-based object on, e.g., a wall in their physical area.

This disclosure describes systems and methods that improve the integration of a user's physical workspace and electronic interactions. For example, embodiments of the systems and methods disclosed herein do not require tasks that are traditionally required for integrating a user's physical workspace with their electronic workspaces. Such traditionally required tasks can include electronic and physical setup tasks such as: repositioning a capture device (e.g., tilting or picking up a webcam); repositioning physical media (e.g., holding a piece of paper up to a webcam); adjusting the intensity of light on the physical media; cropping, rotating, and perspective correction of the physical media; and image optimization, color adjustments, and other post-capture image processing techniques. In traditional setups, these tasks are required each time an image-capture device is used to capture physical content.

Figure 1:
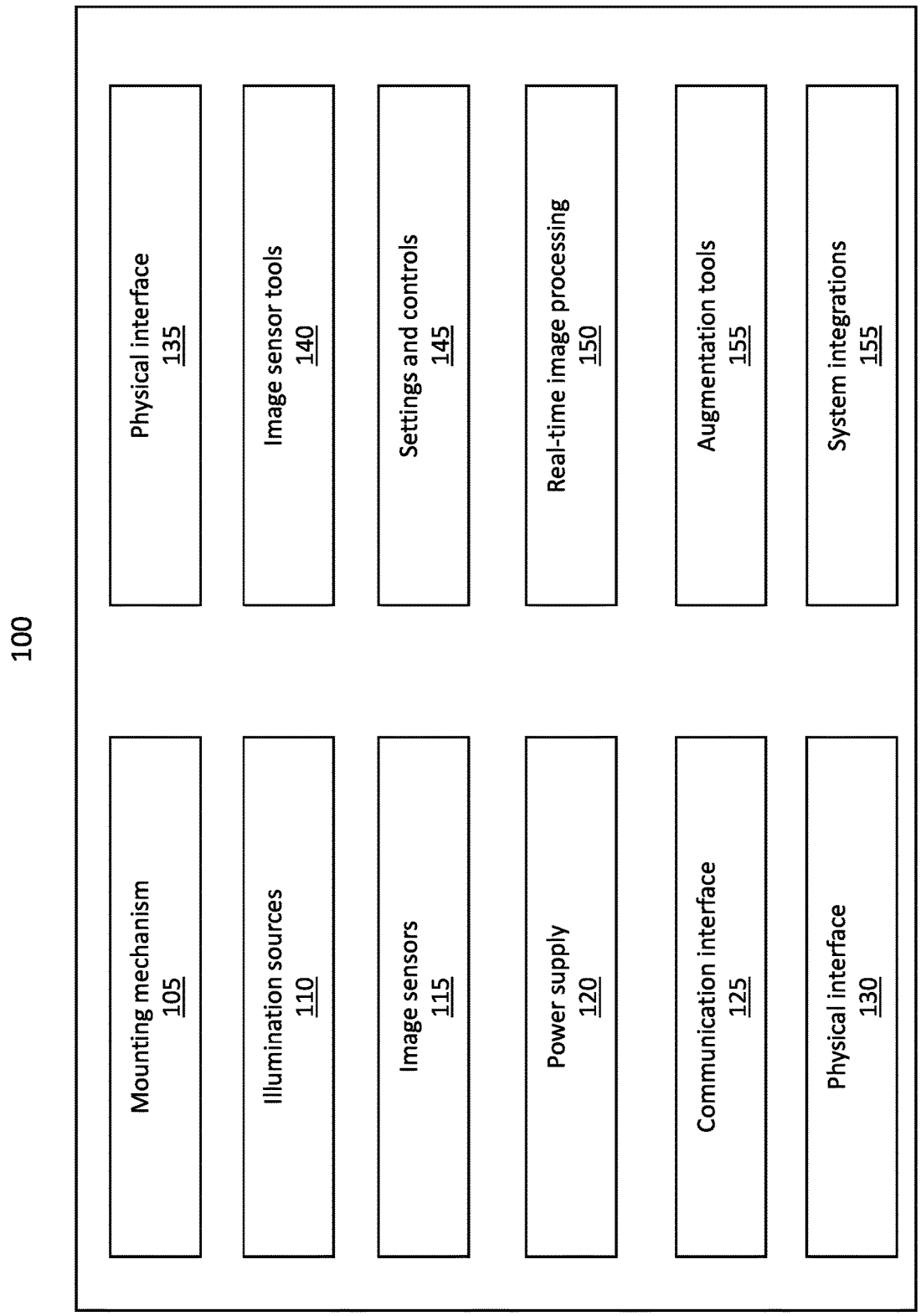
FIG. 1 illustrates components of an example system for integrating electronic and physical workspaces.

FIG. 1 illustrates the main components of an example system 100 for integrating electronic and physical workspaces. As explained more fully herein, certain components of system 100 may be implemented by hardware, by software, or by a combination thereof.

System 100 may include a mounting mechanism 105. In particular embodiments, mounting mechanism 105 may be used to mount physical portions of system 100 at an appropriate position in a user's physical workspace. For example, mounting mechanism 105 may be a clamp that clamps system 100 to, e.g., a user's monitor. As another example, mounting mechanism 105 may be abase so that system 100 may be placed on a flat surface, such as a user's desk. In particular embodiments, mounting mechanism 105 may include magnets, clips, clamps, stands, or any suitable combination thereof. Moreover, this disclosure contemplates that in particular embodiments, mounting mechanism 105 may be removable and attachable by a user, such that, for example, a user may attach a clamp to system 100 and then subsequently remove the clamp and attach abase to system 100. In particular embodiments, all or portions of mounting mechanism 105 may be motorized.

As illustrated in FIG. 1, system 100 may include one or more illumination sources 110. Illumination sources 110 may include one or more LEDs, incandescent bulbs, fluorescent lights or any suitable combination therefore. For example, in particular embodiments illumination sources 110 may include a light bulb as well as one more LED strips. In particular embodiments at least some illumination sources of illumination sources 110 may be capable of relatively high intensity output (e.g., 1000 lumens), so as to reduce shadows cast by other ambient lighting.

Figure 2:
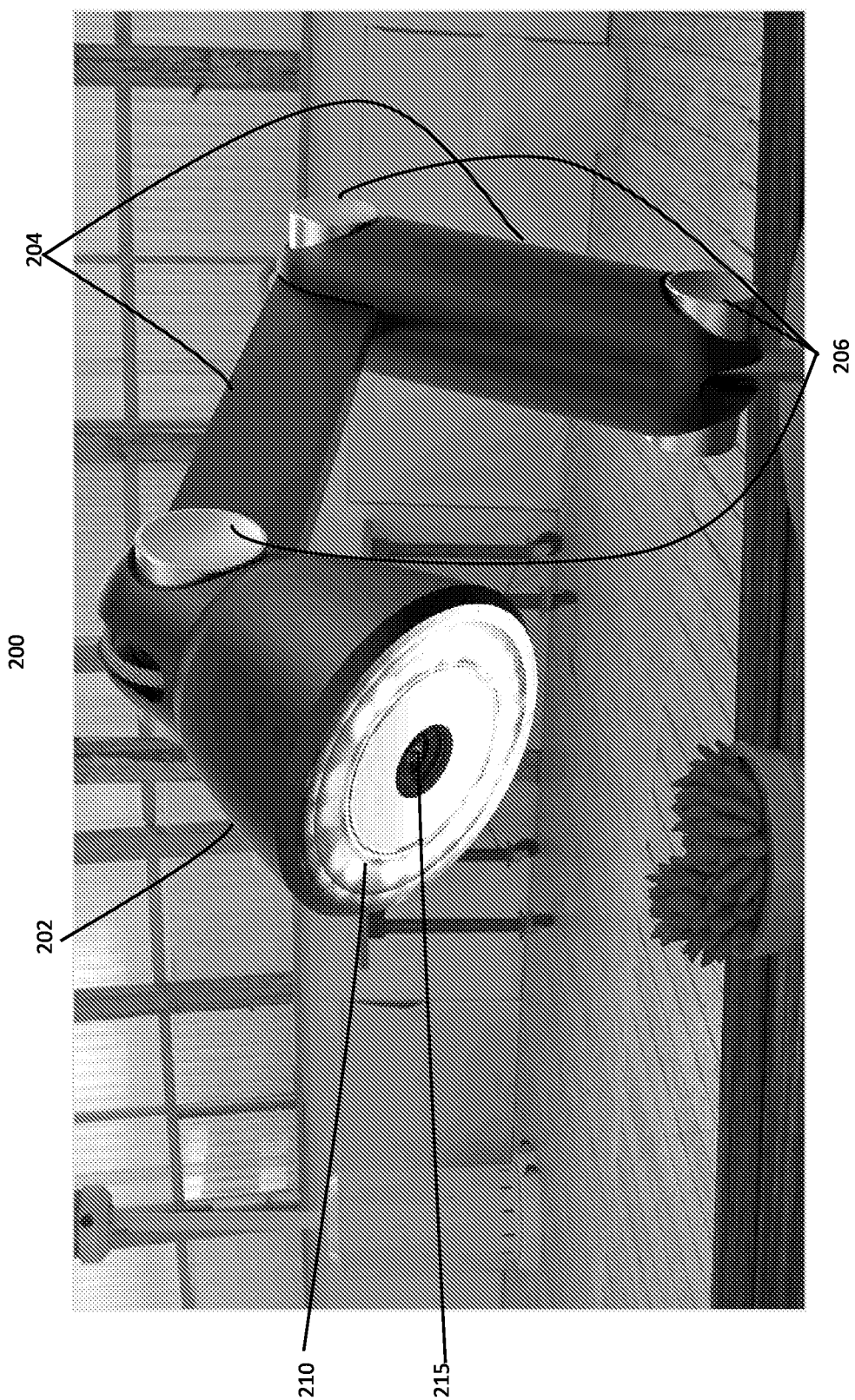
FIG. 2 illustrates a particular embodiment of the system of FIG. 1

In particular embodiments, illumination sources 110 may be arranged on a relatively flat face of a head of system 110. For example, FIG. 2 illustrates a particular embodiment of system 100 that includes head 202. In the example of FIG. 2, illumination sources 210 are disposed on a relatively flat surface of head 202.

As described more fully herein, illumination sources 110 may be arranged in system 100 to provide several benefits. For example, illumination sources 110 may be symmetrically arranged about a particular point in order to, for example, minimize shadows cast on the user's physical workspace by illumination sources 110. For example, as shown in FIG. 2, illumination sources 210 are arranged in a circle about the center of the flat surface of head 202. Moreover, as illustrated by example in FIG. 2, in particular embodiments illumination sources 110 may form a closed shape or boundary, such as a circular shape. In other embodiments, illumination sources may form an open shape, such as a half circle. This disclosure contemplates that illumination sources 110 may be arranged in any suitable shape, such a square, oval, rectangle, triangle, star etc.

As illustrated in FIG. 1, system 100 may include one or more image sensors 115. This disclosure contemplates that an image sensor may include image sensors (such as an optical camera), temporal contrast sensors (such as dynamic vision sensors, or DVS), depth sensors, proximity sensors, structured light sensors, or any suitable combination therefore. As the preceding description illustrates, an image sensor may utilize portions of the EM spectrum outside of visible light, such as infrared or ultraviolet radiation. In particular embodiments, an image sensor may include a high-resolution camera, such as a camera capable of capturing 4K or 8K content.

As illustrated in FIG. 2, illumination sources 110 and image sensors 115 may be disposed in a head unit, such as head 202, of the system. In particular embodiments, the head may include a diffuser that diffuses emission (e.g., visible light) from illumination sources 110. The system may include an adjustable body, such as adjustable body 204. In the example of FIG. 2, joints 206 allow a user (or as described more fully below, system 100) to adjust portions of body 204 and/or to adjust head 202. For example, and with reference to the example of FIG. 2, a user can adjust head 202, thereby adjusting the direction of illumination sources 110 and the field of view of image sensors 115. In particular embodiments, body 204 may include one or more flexible portions, such that the shape of the body itself may be reconfigured, rather than using, e.g., joints 206 as shown in the example of FIG. 2 to adjust the body.

In particular embodiments, a system may be adjustable in four or more degrees of freedom. In particular embodiments, one or more joints may be motorized, so that an adjustment may occur electronically or automatically, such as in response to user input or system commands. In particular embodiments, motorized joints may be controlled by a connected computing device that is receiving or displaying content from an image sensor, or by a secondary control device (e.g., smartphone, smartwatch, etc.). In particular embodiments, motorized joints may respond to a user command or automatically respond to a change in the physical environment, such as changes in the ambient light, a shifted paper, etc., in order to reposition the illumination sources and image sensors in the optimal position to capture the user's physical workspace.

This disclosure contemplates that there may be more than one mechanism for adjusting the body or head of embodiments of the system described in this disclosure. Moreover, the entire system may be relatively easily repositioned (e.g., picked up and moved to another location in a user's physical workspace).

While FIG. 2 illustrates an example form factor of an embodiment of aspects of system 100, this disclosure contemplates that the system may be realized in other form factors with a different head unit, body, and base designs. Moreover, a system may take a completely different form factor than that illustrated in FIG. 2, such as a monitor-mounted form, a tripod-mounted form, a projector form, or a form that includes separate camera and control units.

In particular embodiments, the relative positions of illumination sources 110 and image sensors 115 is an important feature. For example, in particular embodiments one or more image sensors of image sensors 115 may be inline with illumination sources 110, thereby minimizing an offset between the direction of illumination sources 110 and the direction of a field of view of the image sensors (or a center of the direction of illumination sources and a center of the direction of a field of view of the image sensors). For examples, as shown in FIG. 2, image sensor 215 is disposed in the center of the pattern (i.e., circle) formed by illumination sources 210. In particular embodiments, an image sensor may be placed so as to minimize the distance (e.g., the sum of squares of the distances) between the image sensor and each of the illumination sources of illumination sources 110. In particular embodiments, an image sensor may be placed so as to be at or near the geometric center of the shape formed by the illumination sources of illumination sources 110. In particular embodiments, when there is only one illumination source (e.g., one light) and one image sensor (e.g., one camera), then the visual source and illumination source may be placed adjacent to each other, e.g., as near to each other as the form factor of the head will allow.

In particular embodiments, the illumination sources of illumination sources 110 may form a concave line, such as, e.g., a half-circle or whole circle, in which one or more visual elements of visual element 115 are placed. In particular embodiments, illumination sources 110 and image sensors 115 may be able to rotate relative to each other.

As described herein, by aligning illumination sources 110 with image sensors 115, shadows cast by an object may be minimized or hidden from image sensors 115. For example, if a user places their hand over a page that is being illuminated by illumination sources 110 and is within the field of view of image sensors 115, then the shadow cast by the user's hand will appear to image sensors 115 to be directly beneath (i.e., hidden by) the hand, as the field of view of image sensors 115 and the direction of emission by illumination sources 110 are aligned. In contrast, if illumination sources 110 and image sensors 115 were offset, then an object would cast a shadow that, from the perspective of the image sensor, would appear to no longer be beneath the object, which would darken or occlude an otherwise visible portion of the user's physical workspace.

In particular embodiments, image sensors 115 may work in conjunction with illumination sources 110 to adjust the intensity of illumination sources 110 to, for example, reduce shadows or glare on the portion of the user's physical workspace that is within the field of view of image sensors 115. For example, image sensors 115 may detect the intensity of illumination sources 110 when illumination sources 110 are on at a particular intensity level, for example by taking an image when illumination sources 110 are on. One or more images captured by image sensors 115 may also include information regarding shadows, glare, or other visual aspects of the user's physical workspace. Image sensors 115 may pass this information to hardware or software (or both)—which may be integrated within the physical form factor of system 100 or be part of a separate device—that detects image aspects and adjusts the intensity of illumination sources 110 accordingly. For example, if the portion of the user's physical workspace detected by image sensors 115 is too dark, then the intensity of illumination sources 110 may be adjusted higher, while if there is too much glare then the intensity may be adjusted downward. As explained more fully herein, this disclosure contemplates that users may use various tools in their physical workspace such as paper of different colors or pens of different colors, and as described above the system may be easily reconfigurable and adjustable by a user, and therefore the proper illumination intensity may vary based on the characteristics of the user's particular setup and tools used at a given time. Illumination intensity adjustments may be made during system setup, may be made periodically, or may be made substantially continuously when image sensors 115 are capturing information about the user's physical workspace or when system 100 is transmitting captured image data to upstream components for display to users.

In particular embodiments, an active illumination procedure may be used by system 100 to optimize the intensity (or brightness) of illumination sources 110 in a particular instance. For example, two or more images may be taken under different lighting conditions to understand the effect of illumination sources 110, such as a varying intensity of illumination sources 110. This process may be repeated until an acceptably optimum lighting condition (e.g., minimal shadows, glare, etc.) is obtained. For example, a process may begin by disabling illumination sources 110. Then, an image of the user's physical workspace may be captured by image sensors 115. Next, illumination sources 110 may be turned on at a default illumination intensity, such as 50%, 75%, or 100% intensity. An image of the user's workspace as illuminated by illumination sources 110 is captured by image sensors 115, and the captured image(s) are compared to determined the affect of changing intensity on image artifacts, such as shadows. In particular embodiments, the system may adjust the intensity of illumination sources 110, such as by predicting a target illumination value that would reduce or minimize image artifacts, such as shadows. Illumination sources 110 may be set to the target intensity level, and then the process (taking and comparing images and adjusting illumination intensity) may continue until, e.g., a certain number of iterations is reached or a certain optimization level is obtained, or a maximum or minimum intensity level is reached. In particular embodiments, an optimization procedure may also include changing the position of the illumination sources and image sensors.

Lighting optimization may occur as an initialization step, or may periodically or continuously update as the system runs. In particular embodiments, subsets of illumination sources 110 (such as individual illumination sources) may be independently adjustable, so as to, e.g., minimize shadows that cover only a portion of a workspace. In particular embodiments, all illumination sources of illumination sources 110 may be adjusted simultaneously. e.g., as a single unit.

In particular embodiments, and as discussed above, systems may include one or more illumination sources. For example, in particular embodiments the illumination sources may be relatively simple (for example, 2 LEDs) or relatively more complex (for example, an LED array and a digital projector). In particular embodiments, when a system has multiple lighting elements as part of the illumination source, the system can control each element separately to reach the optimal lighting condition. Moreover, in particular embodiments, the system may obtain an optimal lighting condition by initiating a profiling process where the system controls the lighting elements separately based on a lighting profile (e.g., a specified intensity level for each illumination source) and captures an image of the scene as illuminated according to the profile. Based on analysis of one or more of the captured images, a new lighting profile is applied on the physical surface. This process iterates until, e.g., an end condition occurs, such as an acceptable optimal lighting condition being achieved. In particular embodiments, a profile or one or more profiles may be stored and applied for different lighting conditions, e.g., a daytime profile and a nighttime profile.

In particular embodiments, a system as disclosed herein can be connected to or otherwise communicate with one or more lighting systems in the vicinity of the user's physical workspace, e.g., through a wireless communication protocol. Moreover, in particular embodiments the system can control lighting conditions of both the illumination sources of the system and of other lighting in the vicinity of the user's physical workspace. For example, the system may perform an initialization or profiling process as described above by changing the intensity level of room lighting, illumination sources, or both together, and capturing images by the image sensor(s) to determine the image conditions resulting from particular lighting intensities. As a result, the system can determine an optimal lighting level for a particular workspace and illumination source/image sensor location such that images have a reduced number and intensity of shadows and the workspace is illuminated by maximum brightness. In particular embodiments, a user can set constraints for a intensity levels (e.g., a threshold below which room lighting cannot be decreased), and such constraints may be used for different lighting profiles.

As one example of the procedure described above, in particular embodiments a system, such as system 100, may connect to a lighting system in the vicinity of the user's physical workspace, such as a smart lighting system in the room in which the workspace is located. The system may disable all illumination and capture an image. The system may then enable illumination at a default intensity, e.g., by specifying an intensity level for each light source. The system may then capture an image and compare the two captured image to analyze shadows and the effects of lighting of the portion of the user's physical workspace in the field of view of the image sensors. Based on the comparison, the system may determine a target illumination value (e.g., a specific intensity level for each lighting source), set the lighting to the target illumination values, and take another image, which may be compared to the most recently taken preceding image or to all preceding images, or to a subset of all preceding images. The system may then iteratively perform intensity level determinations, set lighting levels, and take and compare images until satisfactory lighting conditions are obtained. Moreover, as explained above, in particular embodiments, these types of procedures may also include adjustments to the orientation of illuminations sources and image sensors.

As illustrated in FIG. 1, system 100 may include a power supply 120. Power supply 120 may include one or more batteries, components for receiving power from USB connections, components for receiving power from standard outlets, and/or components for wireless charging.

As illustrated in FIG. 1, system 100 may include communication interface 125. Communication interface 125 may be used to transmit data between system 100 and other electronic devices, such as personal computers, smart phones, smart wearables, server devices, etc. Communication interface may include one or more wired connections (such ethernet, usb, etc.), wireless connections (such as wifi, bluetooth, zigbee, etc.), storage devices (such as memory cards, flash drives, etc.), or any combination thereof.

As illustrated in FIG. 1, system 100 may include a physical interface 130. Physical interface 130 may include elements such as buttons, switches, touch-sensitive regions, dials, etc. In particular embodiments, one or more physical elements 130 may be located in a head of the system. For example, head 202 of the example of FIG. 2 may include a touch-sensitive area for adjusting the intensity of one or more of the illumination sources 215 or for turning on or off camera 210. In particular embodiments, one or more physical elements 130 may be disposed in a body of the system. In particular embodiments, one or more physical elements 130 may be disposed in a base of the system. For example, buttons or dials for turning on or off a camera or for adjusting the intensity of the illumination sources may be included on the body or the base. As another example, a button for capturing an electronic image by the image sensor may be included on the body or the base.

As illustrated in FIG. 1, system 100 may include one or more feedback elements 135. For example, feedback elements may include features which provide the user with information. In particular embodiments, feedback elements may include one or more lights or other visual indicators, haptic vibration motors, speakers, or buttons. For example, feedback may be provided to the user when the user captures an image, interacts with physical interface 130, repositions the system 100, or in response to other system activity initiated by the user or by the system.

In the example of FIG. 1, components 105-135 are physical elements of the system, although in particular embodiments some of these components may interact with or include software aspects, as well. In particular embodiments, system 100 includes components 140-160, which may be a combination of software and hardware. As explained more fully herein, in particular embodiments some or all of components 140-160 may be implemented in the physical form factor of the system that includes components 105-135, such as the example system illustrated in FIG. 2; may be implemented in one or more connected computing devices such as a user's personal computer, a mobile device, or a server device; or some combination thereof. For example, and as explained more fully herein, some or all of real-time image processing 150 may be implemented as hardware and software residing on the device illustrated in FIG. 2; may be implemented as hardware and software residing on a connected computing device, or some combination thereof.

As shown in the example of FIG. 1, system 100 may include image sensor tools 140. Image sensor tools may include tool integration with the user's computing devices so that image sensors 115 operate as the user's webcam; may include visualization tools; may include image capture and recording tools; and/or may include tools for previewing image capture. For example, some or all of these tools may be implemented as part of a physical interface (e.g., a button) of system 100 or as software via a GUI, such as on a user's connected computing device.

As show in the example of FIG. 1, system 100 may include settings and controls 145 for, e.g., adjusting hardware or software settings such as brightness, resolution, frame rate, capture area, compensation settings, etc. For example, system 100 may include a user interface for viewing and/or adjusting these settings. As described more fully herein, settings and control 145 may be adjusted manually by the user or automatically by system 100, or both.

As shown in FIG. 1, system 100 may also include software and hardware for real-time image processing. As described more fully herein, such software or hardware may be implemented as part of system 100, as part of a connected computing device (e.g., a PC), or any suitable combination therefore. Real-time image processing 150 may perform analysis of, and modifications to, the images captured by image sensors 115. In particular embodiments, modifications may include perspective correction, cropping, image enhancement (e.g., improving contrast), and the like. In particular embodiments, real-time image processing 150 may perform object detection and/or identification of objects in the field of view of image sensors 115, such as hands or instruments like paper, pens, etc.

As discussed herein, embodiments of the systems described herein enable seamless integration between a user's physical workspace and electronic workspace. For example, the implementation and arrangement of illumination sources and image sensors, along with iterative methods for determining appropriate intensity levels, improve image quality by, e.g., reducing shadows in the field of view of the image sensors. In addition, systems described herein are robust to system placement and to the angle relative to the user's workspace. For example, illumination sources and visual sensors do not need to be directly aligned with a user's physical workspace, e.g., pointing directly down at the workspace such that the center of the field of view is perpendicular to a plane of the workspace, in order to integrate high-quality images of the user's physical workspace with the user's electronic workspace.

In particular embodiments, real-time image processing 150 may also play a role in providing the beneficial workspace integration described herein. For example, real-time image processing 150 may include tools for detecting, capturing, or reorienting images, along with other image capturing and processing techniques. For example, real-time image processing 150 may detect an object, such as a piece of paper in the user's physical workspace; apply perspective correction to orient the paper so that the top of the page appears at the top of the image and the paper appears to be viewed from a top-down perspective (i.e., viewed from an angle that is normal to the surface of the paper, as in this example the paper is laying on a flat surface), even if the angle and orientation of image capture is not top-down; apply color adjustments; and/or apply shadow reduction techniques. These techniques may be applied in real-time. Therefore, in particular embodiments, the implementation and relative positioning of illumination sources and image sensors may operate along with system controls and image processing to capture and integrate physical desktops in real-time while allowing the use to place the system in a convenient position in their physical workspace, and without requiring that the placement by optimized for lighting, orientation, and angle.

The following is one example of startup sequence. In particular embodiments, as described more fully herein, a user may select a system as describe herein to be the webcam of a connected computing device, such as a personal computer. Making this selection may activate, e.g., illumination sources and image sensors of the device. A cyclical process may then occur in which the image sensors capture an image frame, which may be from a non-ideal angle or field of view. Within that field of view, an object of interest (such as a piece of paper) may be detected. Real-time image processing 150 may generate a top-down (i.e., normal-to-the-surface) perspective view of the object, using, for example, known camera properties and known and inferred object properties (e.g., a size of a piece of paper, a color of a piece of paper, etc.). The top-down image is then optimized with information from the original image and the top-down image, such as the color, features, objects, edges, etc. of the detected object. The resulting processed image may then be used by the system, e.g., to share with other users with whom the user is electronically collaborating or by placing the image on a clipboard of a connected computing device.

In particular embodiments, real-time image processing 150 may also be used in initializing or setting up a system as describe herein. For example, in particular embodiments a system as described herein can be placed in a physical location. The user may, for example, specify to the system a particular orientation or placement of the system (e.g., at the back of the desk). In particular embodiments, the system may analyze captured images periodically (e.g., upon startup) to determine whether a major scenario change has occurred, for example based on changes in detected objects obstructing the field of view of the user's physical workspace, changes in orientation, changes in background, etc. If a major change is not detected, then typical use can occur. If a major change is detected, then the initial startup sequence may be initialized (e.g., by creating one or more lighting profiles as described more fully herein).

Moreover, as described more fully herein, in particular embodiments the combination of high resolution, wide field of view, automatic lighting correction, and object tracking allow for a one-time setup that can adapt to changes to a workspace. This includes changes to object (e.g., paper) position, lighting conditions, workspace clutter and desk arrangement, etc.

In particular embodiments, after the system 100 is positioned, the view captured by image sensors 115 can be rotated using software image processing to align the image sensor aspect ratio with the physical workspace. Similarly, image-processing software can digitally zoom in on any region in the field of view to, e.g., align the field of view with the edges of an object of interest, such as a piece of paper.

In particular embodiments, real-time image processing 150 may include object detection to, e.g., automatically identify an object such as a piece of paper and crop the image down to that region. In an example process, the image may first be down-sampled to reduce computation requirements. Then, color correction measurements may be performed and applied to this image. A paper-finding algorithm may be applied to the color corrected image to identify aspects such as 4 corners of the paper. This algorithm can be the combination of traditional computer-vision techniques including thresholding (RGB, HSV, LAB, etc), edge detection, and Hough Transformations. If the paper is not detected (e.g., because an object such as the user's hand is in the way), the system can use the last known location of the paper. Once the paper is found, the location of, e.g., the 4 corners are used to transform the original, high-resolution image to match the known aspect ratio of the paper. In particular embodiments, the scale of the image can be determined to match the intended use. For example, preview images may target a lower final resolution. This resulting image may then pass through an image-enhancement algorithm which further improves the image quality. For example, such algorithms may apply additional color balancing based on paper assumptions (e.g., white color), may enhance contrast, and/or may simplify the color palette In particular embodiments, image enhancement techniques such as those discussed herein may include enhancements to visual appearance, resolution, and/or file size. Image enhancements may include changes to image sharpness, brightness, contrast, color balance, vectorization according to a vector graphics file, and/or AI upscaling. In particular embodiments, image enhancement may include color palette adjustments, including but not limited to color, greyscale, and/or reduced color palettes that improve object viewability, such as document readability. Reduced color palettes include common paper and pen color combinations, for example black and white, red and white, blue and white. Color palette enhancement may be done automatically or based on the user's choice. In an automatic implementation, the color palette may be picked based on methods such as K-means clustering.

In particular embodiments, camera or image sensor resolution is an important factor influencing image quality, especially when dealing with flexible camera placement (i.e., other than top-down and correctly oriented placement). In particular embodiments, image sensor resolution must be high enough that even when positioned imprecisely, the sensor is able to get a clear image of the user's physical workspace area. For example, one common practice is to use 200 DPI or higher for handwritten notes.

However, many webcams rarely exceed 1920×1080 resolution. At that resolution, a perfectly aligned 8"×11.5" piece of paper could be only be captured at 127 DPI (i.e., if the paper filled the entire field of view), well below 200 DPI. Any additional misalignment from a top-down view would result in further loss of quality due to the need to crop out a section of the image.

In particular embodiments, image sensors 115 include an optical camera having a minimum camera resolution of 8 MP (mega-pixel) (about 4 k resolution). However, lower or higher resolution cameras may be used, such as, e.g., a 12 MP image sensor. Cameras with higher resolutions also allow the camera to be moved further away from or at a larger angle to the user's physical workspace, which provides more flexible placement options and provides a larger field of view and a larger working area, while still maintaining a desired resolution threshold such as 200 DPI. For example, a 12 MP image sensor provides roughly a 20"×15" working area when positioned at a top-down (i.e., normal-to-the-surface) view of a workspace at a distance providing 200 DP. This relatively large working area in the field of view relative to, e.g., a 8.5"×11" piece of paper helps ensure high-quality image capture even when the camera is poorly aligned with an object such as a piece of paper in the camera's field of view. This disclosure contemplates that in particular embodiments, camera resolution requirements may vary based on the use case.

As shown in the example of FIG. 1, system 100 may include augmentation tools 155. Augmentation tools 155 are tools that enable modifications to images captured by image sensors 115. Such modifications may include visual overlays (e.g., text, drawings, other camera feeds); graphical effects; transformations such as rotations, zooms, etc. These augmentations may be user generated or automatically generated. In particular embodiments, augmentations may be made to a live feed, e.g., a feed that is shared during live collaborations with other users. In other embodiments, augmentations may be made to previously captured images. Augmentation tools may be provided by software, which may execute on the system, execute on a connected computing device, or both. In particular embodiments, augmentation tools may include a highlighter, a pen, a snip tool, a zoom tool, an export tool, etc. In particular embodiments, captured images and, in some instances, the augmentations applied to those images may be stored for future use during a communication session or after the session ends, for example on a user's local storage or on a remote storage device.

In particular embodiments, one or more hardware components such as a CPU, GPU, ASIC, etc., may be implemented on the physical part of system 101 (such the example physical device illustrated in FIG. 2), and these components may perform some or all of the image processing, for example prior to transmitting to the image(s) to a connected computing device. For example, the hardware components may perform perspective correction, cropping, and/or image optimization on-device. This would, for example, provide these beneficial image processing techniques to low-processing-power connected devices (such as certain smartwatches, smart TVs, personal computers, etc.). Moreover, on-device hardware implementations may also or alternatively make more efficient use of bandwidth and compression for data transmission, such as wireless transmission. For example, image processing on-device may crop an image and convert it to a smaller file size or type (e.g., a black-and-white image), which requires less data to transmit than would the full, unprocessed image.

As shown in FIG. 1, system 100 may include software and/or hardware for system integrations 160. System integrations 160 includes the software and hardware that provides communications and interactions with other computational resources such as other programs, applications, scripts, webcams, device storage, Wi-Fi/internet devices, cloud storage, user's computing devices, server devices, etc.

For example, system integrations 160 may include integrating aspects of system 100 with the clipboard functionality of a connected computing device. For example, a user may be working on a personal computer that has a clipboard functionality, which allows the user to cut from, and paste content to, various applications on the personal computer. System integrations 160 may interface image sensors 115 on system 100 with the clipboard functionality on the user's personal computer so that the user can cut, store, and paste content captured by image sensors 115 or within the field of view of image sensors 115 using the clipboard interface and commands of the user's connected personal computer.

As another example, system integrations 160 may include integrating aspects of system 100 with communication or collaboration applications, such as productivity (e.g., spreadsheet, presentation) applications, videoconferencing applications, chat applications, etc. Moreover, such applications may also integrate with the clipboard functionality of a user's computing device, such that a user can, e.g., capture an image using image sensors 115, store that image in the clipboard on the user's computing device, and past from the clipboard to a GUI of the integrated application.

In particular embodiments, after a user instructs system 100 to capture an image (or after system 100 automatically captures an image, e.g., based on a command from a connected computing device or from system 100), image sensors 115 captures the image. As described more fully herein, image processing may be performed after image capture, either by a connected computing device or by system 100 (or both), and the captured, processed image is automatically copied to the clipboard on a connected computing device for use by the user. In particular embodiments triggers for image capture that automatically copies to a system clipboard of a connected computing device could include one or more physical buttons or elements on the physical form factor of system 100, software UI elements such as buttons, keyboard shortcuts on a keyboard providing input to a connected computing device, or a particular pattern such as a user gesture in the field of view of image sensors 115 or a particular drawing on, e.g., a piece of paper in the field of view of image sensors 115. Moreover, while the preceding examples associate these inputs with automatic image capture and clipboard integration, this disclosure contemplates that in particular embodiments such inputs may be used to implement other functionality described herein. For example, a particular pattern created by the user may, e.g., cause system 100 to be identified as the webcam for a user's connected computing device, and/or cause content to begin streaming to other users collaborating over an electronic medium.

In particular embodiments, images may be automatically captured by image sensors 115 and, in some embodiments, automatically associated with a clipboard of a connected computing device. Triggers for automatically capturing images may include a time interval (e.g., every 5 seconds), where the length of the interval may depend on the context (e.g., when motion of a user's hand is detected, a shorter time interval may be used). Other triggers may include inactivity detection (e.g., taking a snapshot when user motion or drawing stops); particular user gestures performed in the field of view of sensors 115; particular symbols created by a user, e.g., on a piece of paper in the field of view of sensors 115; an image-change threshold, such as when image data has changed by a specified threshold; or any suitable combination thereof. As explained above, these triggers may also be associated with other functionality, in particular embodiments, such as saving an image to a connected computing device (e.g., a local or server device) or staring or stopping recording of a video.

As described herein, in particular embodiments integration with the system clipboard of a connected computing device and with webcam detection of the computing device provides any application running on the computing device access to captured content as long as that application has access to the computing device's webcam and clipboard, regardless of which application is being used. This eliminates the need to provide specific integrations for each application that the user uses to communicate with other users, such as videoconferencing applications, productivity applications, chat applications, etc.

In particular embodiments, system integration 160 may integrate with a connected computing device so that image sensors 115 are selectable as the device's webcam. In particular embodiments, captured video feed is pre-processed before the content is provided as webcam output. For example, image processing such as cropping, lighting adjustments, etc. and/or image enhancements such as annotations, zooming, etc. may be processed by system 100, and the processed image(s) may be provided as webcam output to the connected computing device, such that the processed image is provided as if it were the live feed captured by image sensors 115. For example, tools such as annotation, highlighting, zoom, pointing, etc. may be integrated prior to the system integration as a webcam, making the system described herein immediately and seamlessly compatible with applications (e.g., videoconferencing applications) that use a webcam, without needing to develop and have users download application-specific code or plug-ins.

In particular embodiments, a secondary camera may also be used (either implemented as part of system 100 or as part of another computing device) so that additional image presentations can be provided, such as picture-in-picture viewing where other users view both an image of the user and an image of the user's physical content capture by image sensors 115. In particular embodiments, when the user selects system 100 as the webcam for a connected computing device, an application UI for system 100 is presented to the user. This UI may be presented on the connected computing device, such as the user's personal computer, or on another computing device, such as the user's smartphone. Moreover, in particular embodiments selection by the user of system 100 as a webcam on a connected computing device may cause images captured by system 100 to begin streaming on or from another connected computing device.

In particular embodiments, system integration 160 may integrate with image processing tools, such as those described more fully herein. For example, system integration 160 may integrate system 100 with OCR tools for converting handwriting to typed or electronically drawn formats. In particular embodiments, this conversion may happen automatically in response to recognizing handwriting, upon user demand, or as part of a process that captures content for use by a clipboard of a computing device.

While the examples of FIG. 1 and FIG. 2 illustrate and describe aspects of particular embodiments of this disclosure, other aspects are within the scope of this disclosure. For example, particular embodiments may include a system that runs from a mobile device such as a smartphone, or tablet. For example, a mobile device may include an external camera that can be used to capture a user's physical workspace. A mobile version of the system described herein may include UI tools to enable markups and annotations on the mobile device. In particular embodiments, a mobile version of the systems described herein may be launched automatically when the user selects the mobile device as a webcam, or launched manually from either a connected computing device (e.g., a PC) or from the mobile device.

As another example, a portable version of the system described herein may include, or example, a relatively small form factor, an onboard memory to capture content even when not connected to a device, a collapsible design to fold and fit in a small space or carrying case, a power-optimized design (such as high efficiency LEDs, low-power ASIC processing chips, etc.), and/or wireless connectivity to a device or the cloud (Wi-Fi, cellular data, Bluetooth, etc.).

The systems described herein provide a way to integrate a user's electronic and physical workspaces. For example, a system may be used as part of a collaboration and communication tool where users communicate electronically, such as by live video and audio streams. A user may use the system described herein to seamlessly capture and share electronic images of the user's physical workspace, including video of the user's workspace. For example, a user may be communicating via a webcam mounted on, e.g., the user's monitor and having a field of view directed at the user's face. In order to show, e.g., a piece of paper on the user's desk, the user would have to tilt the webcam until the field of view of the webcam showed the paper on the user's desk. However, the field of view of the webcam would not be optimized for the lighting in the room, such that insufficient lighting or shadows may cover the piece of paper. Moreover, communication is disrupted by the user having to adjust the field of view of the webcam through which other users view the user. However, using the system describe herein, a user can seamlessly share images of the user's physical workspace without manually adjusting their electronic components and while minimizing image artifacts that degrade user communication. Moreover, as described herein, embodiments of the system may enable images and video streams of a user's physical workspace that can be annotated by users participating in the communication.

Embodiments of the system described herein may be used in, for example, educational settings, e.g., to show both a video of an instructor speaking and also content in the instructor's physical workspace, such as a whiteboard, a slide, a handout, a physical demonstration or test, etc. Embodiments of the system may be used to facilitate remote work, allowing participants to seamlessly view each other and also to view physical work product in users' physical space, even thorough the users are physical remote from each other.

Figure 3:
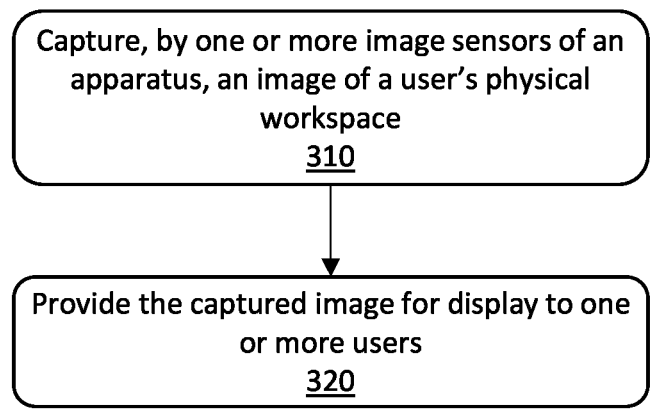
FIG. 3 illustrates an example method of using an embodiment of a system described herein.

FIG. 3 illustrates an example method of using an embodiment of a system described herein. Step 310 includes capturing, by one or more image sensors of an apparatus, an image of a user's physical workspace. The apparatus includes a head that contains the image sensors and illumination sources. For example, FIG. 2 illustrates an example embodiment having head 220 that houses illumination sources 210 and image sensors 215. As explained herein, in particular embodiments the intensity level of the one or more illumination sources is adjustable, e.g., based on a user command or automatically based on instruction from the apparatus or from a connected computing device. As describe more fully herein, a position and/or an orientation of the head is adjustable, and thus the position and/or orientation of the illumination sources and image sensors are adjustable. For example, as shown in FIG. 2, the position and orientation of head 202 may be adjusted based on changes to the joint values of joints 206.

In the example of FIG. 3, Step 320 includes providing the captured image for display to one or more users. This step may entail providing the captured image to a connected device, which processes the image (or provides the image to, e.g., a server device for processing) and transmits the image for display to users who are electronically collaborating with the user whose physical workspace is being captured. Additionally or alternatively, step 320 may entail directly providing the image to one or more other users, such as by transmitting the image to a computing device of at least one of the other users. In particular embodiments, step 320 may entail storing the image for a period of time until such image is actually displayed to another user. In particular embodiments, step 320 entails providing the captured image for image processing (such as by the apparatus or by a connected computing device), which may process the image and then provide the processed image for display.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3. Moreover, this disclosure contemplates that some or all of the computing operations described herein, including certain steps of the example method illustrated in FIG. 3, may be performed by circuitry of a system described herein, by a processor coupled to non-transitory computer readable storage media, or any suitable combination thereof.

Figure 4:
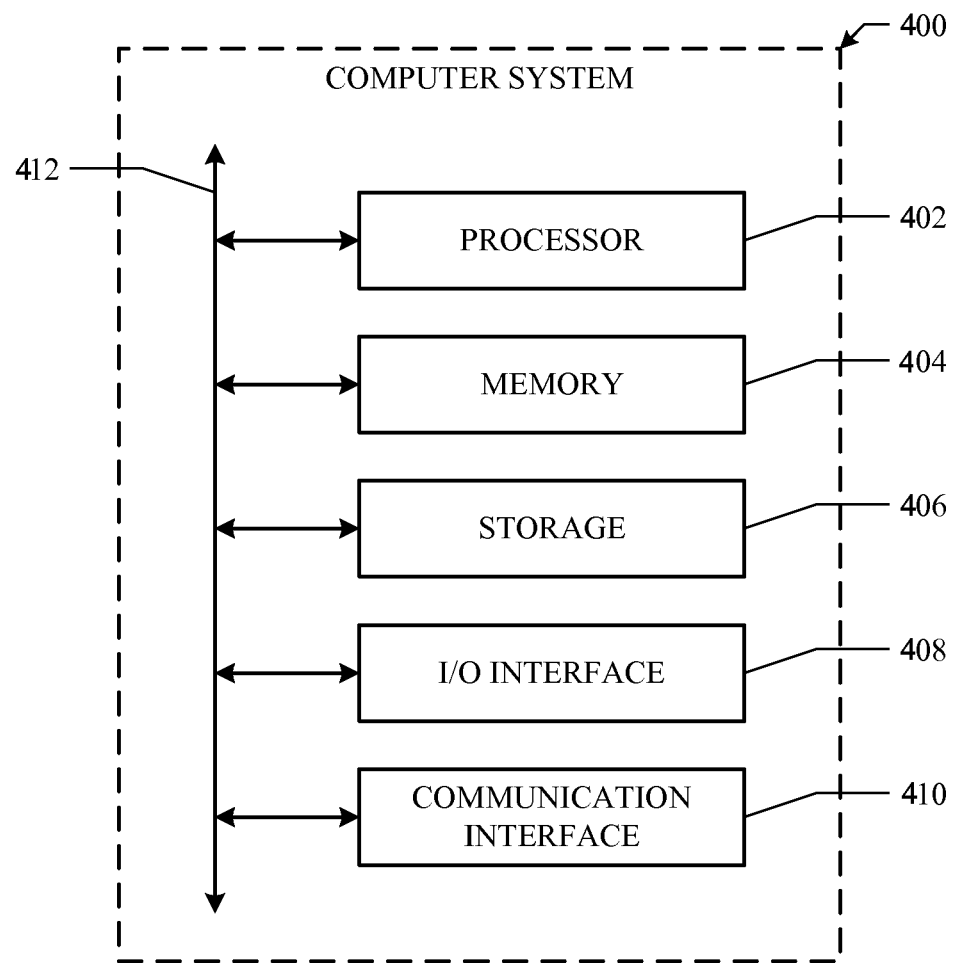
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not necessarily limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A system comprising one or more processors and one or more non-transitory computer readable storage media embodying instructions coupled to the one or more processors, the one or more processors operable to execute the instructions to:
    capture, by one or more image sensors of an apparatus, an initial image of a user's physical workspace, wherein:
        the apparatus comprises a head unit comprising a plurality of illumination sources and the one or more image sensors; and
        an intensity level of each of the plurality of illumination sources is separately adjustable and a position or an orientation of the head unit is adjustable; and
    determine a brightness-related visual artifact in the captured initial image of the user's physical workspace;
    automatically adjust an intensity level of at least one of the plurality of separately adjustable illumination sources based on the determined brightness-related visual artifact in the initial captured image;
    automatically capture, by the one or more image sensors, a subsequent image of the user's physical workspace as illuminated by the adjusted intensity level of the at least one of the plurality of separately adjustable illumination sources;
    compare the initial image to the subsequent image to determine the effect of the intensity-level adjustment on the brightness-related visual artifact;
    further automatically adjust the intensity level of at least one of the plurality of separately adjustable illumination sources based on the comparison; and
    further capture images at different adjusted intensity levels and compare captured images at different levels to determine further automatic adjustments to the intensity level of at least one of the plurality of separately adjustable illumination sources, until a stopping condition regarding the brightness-related visual artifact is met.

2. The system of claim 1, wherein:
the plurality of separately adjustable illumination sources define a boundary within the head unit; and
the one or more image sensors are disposed within the boundary.

3. The system of claim 1, wherein the one or more image sensors are disposed at a geometric center of the plurality of separately adjustable illumination sources.

4. The system of claim 1, wherein the processors are further operable to execute the instructions to:
turn on at least one of the plurality of separately adjustable illumination sources to a preset intensity level;
determine, based on a preliminary image of the user's physical workspace, one or more image conditions;
adjust, based on the determined image conditions, an intensity of the at least one of the plurality of separately adjustable illumination sources; and
set the at least one of the plurality of separately adjustable illumination sources to illuminate at the adjusted intensity level while the one or more image sensors capture the image of the user's physical workspace.

5. The system of claim 1, wherein the processors are further operable to execute the instructions to:
identify a physical object in a field of view of the one or more image sensors; and
crop the captured image to the physical object.

6. The system of claim 1, wherein the processors are further operable to execute the instructions to create from the captured image a processed image that provides a top-down perspective of at least part of the user's physical workplace.

7. The system of claim 1, wherein the processors are further operable to execute the instructions to:
receive, from a user, an annotation to the captured image; and
provide the captured image as annotated for display to one or more users.

8. The system of claim 1, wherein the processors are further operable to execute the instructions to:
identify the apparatus as a webcam associated with a client computing device;
process the captured image; and
provide the processed captured image webcam output for use by one or more applications executing on the client computing device.

9. The system of claim 1, wherein the one or more processors are further operable to execute the instructions to automatically capture, based on one or more criteria, the image of the user's physical workspace.

10. The system of claim 9, wherein the one or more criteria comprise one or more of:
a motion of an object in the user's physical workspace;
an amount of time since a previous image of the user's physical workspace was captured; or
one or more changes in a lighting of the user's physical workspace or in a location of an object in the user's physical workspace.

11. The system of claim 1, wherein the one or more processors are further operable to execute the instructions to automatically provide the capture image to a clipboard of computing device.

12. An apparatus comprising:
a head unit comprising one or more image sensors and a plurality of illumination sources, wherein an intensity level of each of the plurality of illumination sources is separately adjustable and a position or an orientation of the head unit is adjustable; and
one or more processors and a non-transitory computer readable storage media embodying instructions coupled to the one or more processors, the one or more processors operable to execute the instructions to:
capture, by the one or more image sensors, an initial image of a user's physical workspace;
determine a brightness-related visual artifact in the captured initial image of the user's physical workspace;
automatically adjust an intensity level of at least one of the plurality of separately adjustable illumination sources based on the determined brightness-related visual artifact in the initial captured image;
automatically capture, by the one or more image sensors, a subsequent image of the user's physical workspace as illuminated by the adjusted intensity level of the at least one of the plurality of separately adjustable illumination sources;
compare the initial image to the subsequent image to determine the effect of the intensity-level adjustment on the brightness-related visual artifact;
further automatically adjust the intensity level of at least one of the plurality of separately adjustable illumination sources based on the comparison; and
further capture images at different adjusted intensity levels and compare captured images at different levels to determine further automatic adjustments to the intensity level of at least one of the plurality of separately adjustable illumination sources, until a stopping condition regarding the brightness-related visual artifact is met.

13. The apparatus of claim 12, wherein:
the plurality of separately adjustable illumination sources define a boundary within the head unit; and
the one or more image sensors are disposed within the boundary.

14. The apparatus of claim 12, wherein the plurality of separately adjustable image sensors are disposed at a geometric center of the one or more illumination sources.

15. The apparatus of claim 12 wherein the processors are further operable to execute the instructions to:
turn on at least one of the plurality of separately adjustable illumination sources to a preset intensity level;
determine, based on a preliminary image of the user's physical workspace, one or more image conditions;
adjust, based on the determined image conditions, an intensity of the at least one of the plurality of separately adjustable illumination sources; and
set the at least one of the plurality of separately adjustable illumination sources to illuminate at the adjusted intensity level while the one or more image sensors capture the image of the user's physical workspace.

16. The apparatus of claim 12, wherein the processors are further operable to execute the instructions to create from the captured image a processed image that provides a top-down perspective of at least part of the user's physical workplace.

17. The apparatus of claim 12, wherein the processors are further operable to execute the instructions to:
identify the apparatus as a webcam associated with a client computing device;
process the captured image; and
provide the processed captured image webcam output for use by one or more applications executing on the client computing device.

18. A method comprising:
capturing, by one or more image sensors of an apparatus, an initial image of a user's physical workspace, wherein:
 the apparatus comprises a head unit comprising a plurality of illumination sources and the one or more image sensors; and
 an intensity level of each of the plurality of illumination sources is separately adjustable and a position or an orientation of the head unit is adjustable;
determining a brightness-related visual artifact in the captured initial image of the user's physical workspace;
automatically adjusting an intensity level of at least one of the plurality of separately adjustable illumination sources based on the determined brightness-related visual artifact in the initial captured image;
automatically capture, by the one or more image sensors, a subsequent image of the user's physical workspace as illuminated by the adjusted intensity level of the at least one of the plurality of separately adjustable illumination sources; and
comparing the initial image to the subsequent image to determine the effect of the intensity-level adjustment on the brightness-related visual artifact;
further automatically adjusting the intensity level of at least one of the plurality of separately adjustable illumination sources based on the comparison; and
further capturing images at different adjusted intensity levels and compare captured images at different levels to determine further automatic adjustments to the intensity level of at least one of the plurality of separately adjustable illumination sources, until a stopping condition regarding the brightness-related visual artifact is met.

19. The method of claim 18, wherein:
the plurality of separately adjustable illumination sources define a boundary within the head unit; and
the one or more image sensors are disposed within the boundary.

20. The method of claim 18, further comprising:
turning on at least one of the plurality of separately adjustable illumination sources to a preset intensity level;
determining, based on a preliminary image of the user's physical workspace, one or more image conditions;
adjusting, based on the determined image conditions, an intensity of the at least one of the plurality of separately adjustable illumination sources; and
setting the at least one of the plurality of separately adjustable illumination sources to illuminate at the adjusted intensity level while the one or more image sensors capture the image of the user's physical workspace.

* * * * *